US010814676B2

(12) United States Patent
Marlier et al.

(10) Patent No.: US 10,814,676 B2
(45) Date of Patent: Oct. 27, 2020

(54) TREAD FOR HEAVY TRUCK WINTER TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Fabien Marlier, Clermont-Ferrand (FR); Damien Bardin, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 230 days.

(21) Appl. No.: 15/538,950

(22) PCT Filed: Dec. 18, 2015

(86) PCT No.: PCT/EP2015/080438
§ 371 (c)(1),
(2) Date: Jun. 22, 2017

(87) PCT Pub. No.: WO2016/102350
PCT Pub. Date: Jun. 30, 2016

(65) Prior Publication Data
US 2017/0355231 A1    Dec. 14, 2017

(30) Foreign Application Priority Data

Dec. 23, 2014  (FR) ...................................... 14 63519

(51) Int. Cl.
*B60C 11/03*     (2006.01)
*B60C 11/12*     (2006.01)
(Continued)

(52) U.S. Cl.
CPC .......... *B60C 11/0302* (2013.01); *B60C 11/01* (2013.01); *B60C 11/0304* (2013.01);
(Continued)

(58) Field of Classification Search
CPC ............... B60C 11/302; B60C 2200/06; B60C 11/0323; B60C 11/0306; B60C 11/11; B60C 11/12
See application file for complete search history.

(56) References Cited

U.S. PATENT DOCUMENTS

| 6,408,910 B1 | 6/2002 | Lagnier et al. |
| 8,281,830 B2 | 10/2012 | Ebiko |

(Continued)

FOREIGN PATENT DOCUMENTS

| JP | H0648124 A | 2/1994 |
| JP | 2005153655 A | 6/2005 |

OTHER PUBLICATIONS

International Search Report corresponding to PCT/EP2015/080438, dated Mar. 9, 2016.

*Primary Examiner* — Timothy Kennedy
*Assistant Examiner* — Alexander A Wang
(74) *Attorney, Agent, or Firm* — Dickinson Wright PLLC; Steven Hurles

(57) ABSTRACT

The tread has four grooves that delimit a central, intermediate and edge regions. Each intermediate region is divided into elongated raised elements that delimit oblique grooves which open into the circumferential grooves and are inclined at an average angle of between 30 and 60 degrees relative to the circumferential direction. The raised elements have an average circumferential length of between 50 and 70 mm. The depth of the oblique grooves is at least 30% of the depth of the circumferential grooves. Each raised element has a plurality of sipes that open into the oblique grooves. Each (Continued)

raised element also has an internal and oblique cut that has a total depth at least equal to 75% of the thickness PMU to be worn away. The oblique cut has a wide part and a part that forms a sipe that extends by a channel that forms a new groove after wear.

10 Claims, 2 Drawing Sheets

(51) Int. Cl.
    *B60C 11/01*      (2006.01)
    *B60C 11/04*      (2006.01)
    *B60C 11/11*      (2006.01)

(52) U.S. Cl.
    CPC ...... *B60C 11/0306* (2013.01); *B60C 11/0323* (2013.01); *B60C 11/04* (2013.01); *B60C 11/11* (2013.01); *B60C 11/12* (2013.01); *B60C 11/1281* (2013.01); *B60C 2011/036* (2013.01); *B60C 2011/0346* (2013.01); *B60C 2011/0365* (2013.01); *B60C 2011/0372* (2013.01); *B60C 2011/0381* (2013.01); *B60C 2011/0383* (2013.01); *B60C 2011/0388* (2013.01); *B60C 2011/1209* (2013.01); *B60C 2011/1213* (2013.01); *B60C 2200/06* (2013.01)

(56) References Cited

U.S. PATENT DOCUMENTS

| | | | |
|---|---|---|---|
| 9,027,613 B2* | 5/2015 | Hamada | B60C 11/11 |
| | | | 152/209.15 |
| 2002/0011291 A1 | 1/2002 | Ikeda | |
| 2010/0139826 A1 | 6/2010 | Matsumoto | |
| 2011/0168311 A1* | 7/2011 | Voss | B29D 30/0606 |
| | | | 152/209.18 |
| 2013/0153100 A1 | 6/2013 | Piffard et al. | |
| 2016/0144664 A1* | 5/2016 | Kimura | B60C 11/04 |
| | | | 152/209.22 |

* cited by examiner

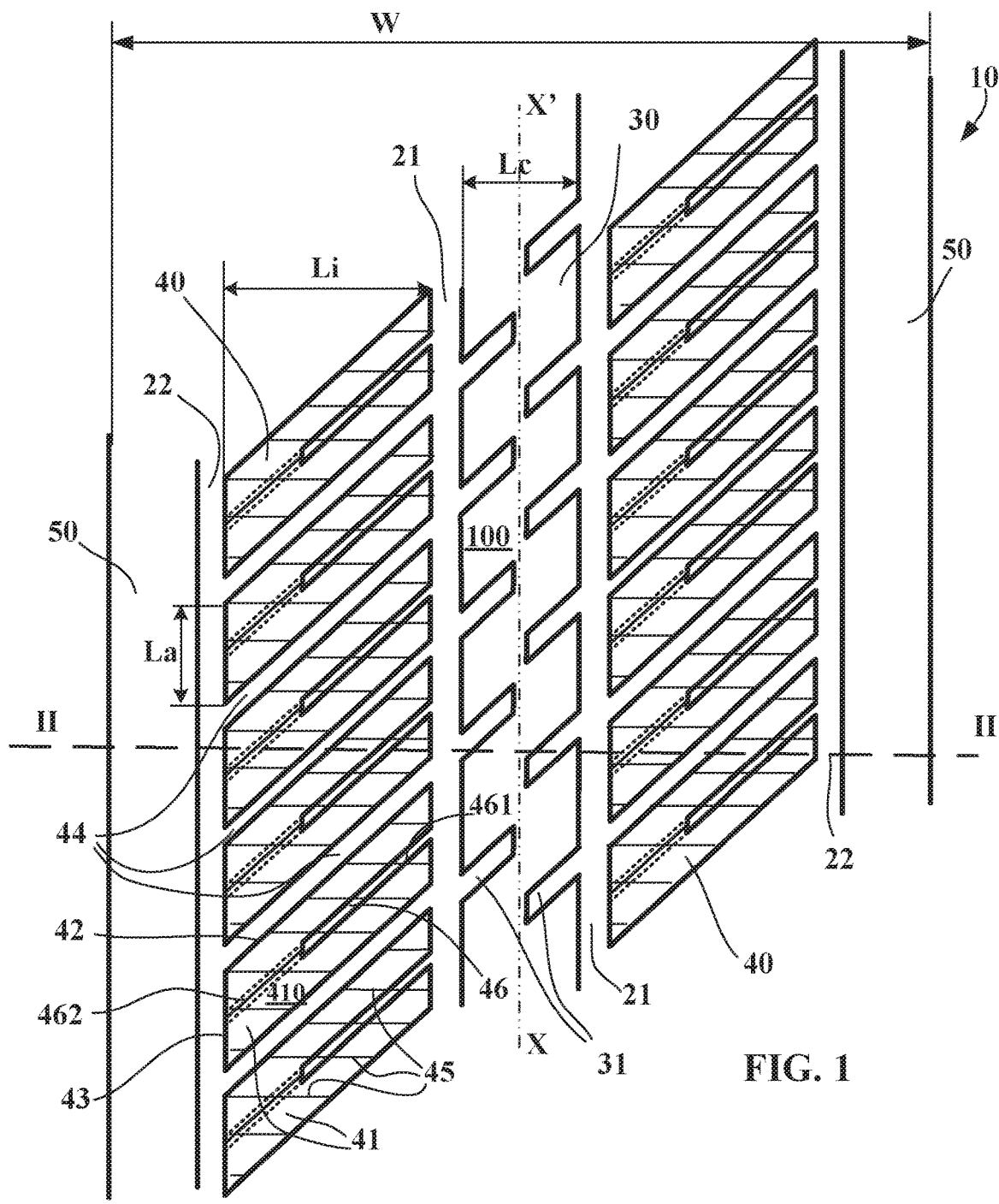
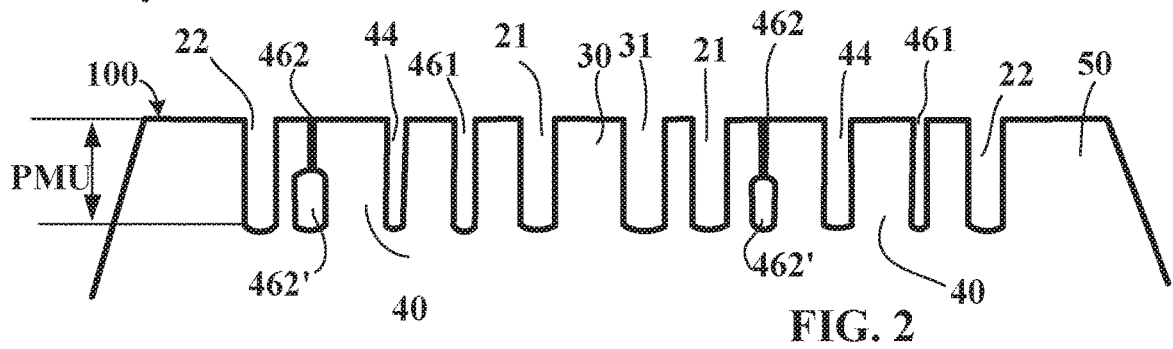
FIG. 1
FIG. 2

TREAD FOR HEAVY TRUCK WINTER TIRE

CROSS-REFERENCE TO RELATED APPLICATION

The present invention claims priority to PCT International Patent Application Serial No. PCT/EP2015/080438 filed Dec. 18, 2015 entitled "Tread For Heavy Truck Winter Tire," which claims the benefit of FR Patent Application Serial No. 1463519 filed Dec. 23, 2014, the entire disclosures of the applications being considered part of the disclosure of this application and hereby incorporated by reference.

BACKGROUND OF THE INVENTION

1. Field of the Invention

The present disclosure relates to treads for tires and more particularly to the tread patterns of these treads and to the tires provided with such treads, the performance of which is improved under winter running conditions.

2. Related Art

As is known, tires for heavy vehicles are provided with a tread, the tread surface of which is intended to come into contact with the roadway during running.

In order to meet the conditions for running on a roadway covered with water, a suitable pattern is formed in the tread of each tire, this pattern being created by the grooves and more generally voids or cavities and cuts having depths and volumes that are suitable for ensuring lasting performance throughout the use of the tire down to its wear limit. This wear limit is determined by the regulations of the countries in which running takes place.

It has been found that, in order to ensure a good safety performance under certain running conditions, notably winter running, it is necessary to supplement the tread pattern with a plurality of sipes, these sipes creating a large number of edge corners that are useful for increasing grip on icy roadways without however affecting the rigidity of the tread.

It is a known procedure—see notably the publication WO2013015375 A1—to form grooves that are inclined at an angle close to 45° in order to create a plurality of blocks, these blocks having an elongate shape and being provided with a plurality of sipes so as to create multiple edge corners. However, it should be noted that, with this type of tread pattern, wear referred to as irregular wear can develop, that is to say wear which is not distributed evenly over the entire tread surface of the tread. Notably, more pronounced wear can arise on the central part of the tread, that is to say on that part of the tread that is centered on the equatorial mid-plane. Another problem that is encountered with this type of tread pattern is a certain sensitivity to attacks suffered during running.

The object of the disclosure is to propose a novel tread pattern for a tire tread of a heavy vehicle, combining both a high level of grip on the road under wintry conditions and good resistance to attacks while reducing the appearance of irregular wear.

Definitions

A radial direction is understood to mean in the present document a direction which is perpendicular to the axis of rotation of the tire (this direction corresponds to the direction of the thickness of the tread).

A transverse or axial direction is understood to mean a direction parallel to the axis of rotation of the tire.

A circumferential direction is understood to mean a direction tangential to any circle centered on the axis of rotation. This direction is perpendicular both to the axial direction and to a radial direction.

The equatorial mid-plane is a plane perpendicular to the axis of rotation and passing through the points of the tire that are radially farthest from said axis. For a tread, this plane divides the tread widthwise into two halves of equal widths.

A rib is a raised element formed on a tread, this element extending in the circumferential direction and making a circuit of the tire. A rib comprises two side walls and a contact face, the latter being intended to come into contact with the roadway during running.

A cut generically denotes either a groove or a sipe and corresponds to the space delimited by walls of material that face one another and are at a non-zero distance from one another (referred to as the "width of the cut"). It is precisely this distance that differentiates a sipe from a groove: in the case of a sipe, this distance is suitable for allowing the opposing walls that delimit said sipe to come into at least partial contact at least when the sipe enters the contact patch in which the tire is in contact with the roadway. In the case of a groove, the walls of this groove cannot come into contact with one another under usual running conditions.

A tread has a maximum thickness PMU of material to be worn away during running; once this thickness has been reached, either the tire can be regrooved in order to benefit from new grooves, or the tire is replaced with another, new tire.

The usual running conditions of the tire or use conditions are those which are defined notably by the E.T.R.T.O. standard or any equivalent standard depending on the country in question; these use conditions specify the reference inflation pressure corresponding to the load-bearing capability of the tire as indicated by its load index and speed rating. These use conditions may also be referred to as "nominal conditions" or "working conditions".

SUMMARY OF THE INVENTION AND ADVANTAGES

The present disclosure relates to a tread for a heavy vehicle tire, this tread having, in the new state, a tread surface of width W that is intended to come into contact with a roadway, and having a thickness PMU of material to be worn away during running.

This tread comprises:
a mid-plane that divides the tread into two tread halves,
four grooves of circumferential overall orientation that are formed symmetrically with respect to the mid-plane, these grooves having depths at least equal to the thickness PMU of material to be worn away, the two grooves closest to the mid-plane delimiting a central region having a width Lc at least equal to 13% and at most equal to 20% of the total width W of the tread,
on each side of the tread with respect to the mid-plane, an intermediate region that is delimited by two grooves of circumferential overall orientation, each intermediate region having a width Li of between 13% and 30% of the width W of the tread,
an edge region axially on the outside of each intermediate region.

Each of the intermediate regions is divided into a plurality of elongate raised elements, the contact faces of which are intended to come into contact with the roadway during running. These elongate raised elements comprise long sides and short sides, and delimit oblique grooves having an average width at least equal to 5 mm and opening into the circumferential grooves that delimit the intermediate regions and being inclined at an average angle of between 30 degrees and 60 degrees—this angle being measured with respect to the circumferential direction. These elongate raised elements have an average length in the circumferential direction equal to the length of the short sides and between 50 and 70 mm; the depth of the oblique grooves is at least equal to 30% of the depth of the circumferential grooves.

Each elongate raised element also comprises a plurality of sipes with a depth at least equal to 50% and at most equal to 100% of the depth of the oblique grooves, these sipes opening into the oblique grooves bordering the elongate elements, these sipes being oriented so as to intersect the internal and oblique cut.

This tread is characterized in that:
each elongate raised element of the intermediate regions also comprises an internal and oblique cut that extends in a direction equal or similar to the direction of the oblique grooves bordering this elongate raised element and divides the element into two element parts so as to open onto the short sides of the element and is formed by a wide part forming a groove with a width at least equal to 25% and at most equal to 110% of the width of the oblique grooves and by a narrow part forming a sipe with a width less than 1.5 mm, these wide and narrow parts being in line with one another, each narrow part forming a sipe is extended radially inwards by a part forming a channel that is intended to form a new groove after a predetermined amount of wear, and in that each internal and oblique cut has a total depth at least equal to 75% of the thickness PMU to be worn away.

each narrow part forming a sipe is extended radially inwards by a part forming a channel that is intended to form a new groove after a predetermined amount of wear, and in that each internal and oblique cut has a total depth at least equal to 75% of the thickness PMU to be worn away.

By virtue of the provisions of the disclosure, a tread is has a central region having a good wear pattern and good resistance to attacks, while the intermediate regions encourage good performance on a snow-covered road by virtue of these obliquely oriented elongate elements.

Advantageously, this tread is configured such that each channel that is intended to form a new groove after partial wear has a width at least equal to 25% and at most equal to 110% of the width of the oblique grooves. Preferably, this new groove has the same width as the wide part already present in the new state.

By virtue of such provisions, it is possible to improve the long-term grip performance as the tread wears down, while obtaining regular wear distributed over the entire tread surface of the tread.

Advantageously, this tread is configured such that the total length of each narrow part forming a sipe is at least equal to 30% of the length of the long side of the elongate raised element.

In an advantageous variant, and in order to further reduce noise during running, this tread is configured such that the oblique grooves of an intermediate region of the tread are offset circumferentially with respect to the oblique grooves of the other intermediate region.

In another advantageous variant, the tread is configured such that the oblique grooves formed on the intermediate parts are oriented so as to create a directional tread pattern, that is to say one having an optimal running direction.

It is advantageous for all of the central oblique grooves formed in the central region to be inclined at one and the same angle measured with respect to the circumferential direction, this angle being different from the angles of the oblique grooves in the intermediate regions.

It is advantageous for all of the central oblique cuts to be offset circumferentially and equidistant from one another.

Advantageously, the oblique grooves of each intermediate region are extended by further grooves in each edge region. Preferably, these additional grooves formed in the edges make, with the circumferential direction, an angle different from the angle of the oblique grooves of the intermediate regions. The angle of the grooves of these edge regions with the circumferential direction is equal or close to 90°.

Further features and advantages of the disclosure will become apparent from the following description with reference to the appended drawings which show, by way of nonlimiting examples, embodiments of the subject matter of the disclosure.

BRIEF DESCRIPTION OF THE FIGURES

FIG. 1 shows a plan view of the surface of a first variant of a tread according to the disclosure;

FIG. 2 shows a sectional view of the tread shown in FIG. 1; and

DETAILED DESCRIPTION OF THE ENABLING EMBODIMENTS

Figure 3:
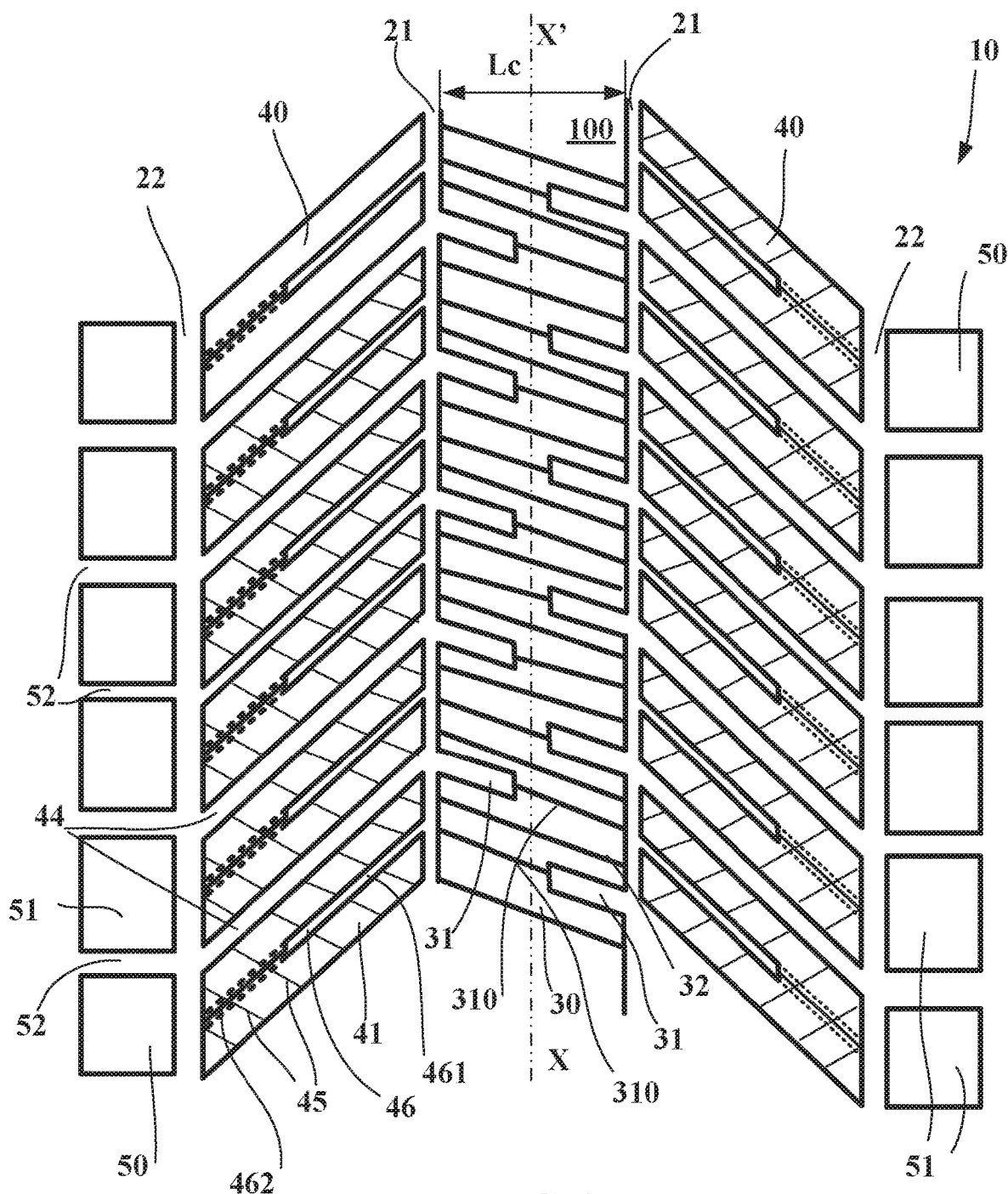
FIG. 3 shows a second variant of a tread according to the disclosure.

To make the figures easier to understand, identical reference signs have been used to denote variants of the disclosure where these reference signs refer to elements of the same kind, whether structurally or functionally.

FIG. 1 shows a plan view of the surface of a tread according to a first variant of the disclosure. This variant relates to a non-directional tread pattern, that is to say one that does not impose a preferred running direction.

In this FIG. 1, a tread 10 for a heavy vehicle tire, this tread having, in the new state, a tread surface 100 of width W that is intended to come into contact with a roadway, this tread having a thickness PMU of material to be worn away during running that corresponds to the thickness of material between the tread surface in the new state and a level corresponding to a legal wear limit. This legal limit is generally defined by a raised platform with respect to the bottom of the deepest groove.

This tread comprises:
a mid-plane XX' that divides the tread axially into two halves with the same width,
four grooves 21, 22 of circumferential overall orientation that are formed symmetrically with respect to the mid-plane XX',
the two grooves 21 closest to the mid-plane XX' delimiting a region 30 having a width Lc in the present case equal to 15% of the total width W of the tread,
on each side of the mid-plane XX', an intermediate region 40 that is delimited by two grooves 21, 22 of circumferential overall orientation, each intermediate region 40 having a width Li of between 13% and 30% of the width W of the tread, an edge region 50 axially on the outside of each intermediate region 40. In the present case, these edge regions 50 form circumferentially continuous ribs.

Each intermediate region 40 is divided into a plurality of elongate raised elements 41 (elongate is understood to mean an element of which the face in contact with the roadway has a rectangular shape), the contact faces 410 of which that are intended to come into contact with the roadway during running comprise long sides 42 and short sides 43, these elongate elements 41 delimiting oblique grooves 44, these oblique grooves opening into the circumferential grooves 21, 22 that delimit the intermediate regions and being inclined at an average angle that is equal in the present case to 40 degrees—this angle being measured with respect to the circumferential direction. These elongate raised elements 41 have an average length in the circumferential direction equal to the length La of the short sides 43 and between 50 and 70 mm, the depth of the oblique grooves being at least equal to 30% of the depth of the circumferential grooves 21, 22 and preferably at least 50% of the depth of the circumferential grooves.

Each elongate raised element 41 also comprises a plurality of sipes 45 with a width of 0.6 mm and a depth at least equal to 50% and at most equal to 100% of the depth of the oblique grooves 44, these sipes 45 opening into the oblique grooves 44 bordering the elongate elements 41.

Moreover, this tread is configured such that:

each oblique groove 44 is extended in the central region 30 of the tread by a central oblique groove 31 that only opens into a circumferential groove 21 and does not extend beyond half the width Lc of the central region 30;

each elongate raised element 41 of the intermediate regions 40 comprises an internal and oblique cut 46 that extends in a direction equal or similar to the direction of the oblique grooves 44 bordering this elongate raised element and divides the element into two element parts in the circumferential direction, each internal and oblique cut 46 opening onto the two short sides 43 of the elongate raised element, each internal and oblique cut 46 has a total depth at least equal to 75% of the thickness PMU to be worn away and comprises a first part forming a groove 461 that opens into a circumferential groove with a width equal to 50% of the width of the oblique grooves and a second part forming a sipe 462 with a width equal to 0.6 mm that opens both onto the tread surface 100 in the new state and into the other circumferential groove delimiting the same oblique raised element.

Furthermore, the sipes 45 formed on the elongate elements 41 are oriented so as to intersect the direction of the internal and oblique cut 46. The sipes formed are able to close on entering the contact patch, that is to say have their walls at least partially in contact.

FIG. 2 shows a radial section (that is to say a section containing the axis of rotation of the tire) on a line II-II shown in FIG. 1.

It can be seen that the sipes 462 are extended, starting from a depth equal to half the height PMU of material to be worn away, by channels 462' that are intended to form new grooves after partial wear. In the present case, the grooves 461 have a depth equal to the maximum depth of the channels. Each channel has a width which is more or less equal to the width of the wide part of the internal and oblique cut 46 so as to create a groove appropriate for drainage after partial wear.

FIG. 3 shows a second variant of a tread according to the disclosure. This variant relates to a directional tread pattern, that is to say one having a preferred mounting direction in order to benefit from optimal performance.

For this variant, the reference signs from FIG. 1 have been used when they denote similar features.

In this second variant of a tread 10, it can be seen that the intermediate regions 40 are constructed in a symmetrical manner with respect to the mid-plane XX' and that a circumferential offset has been created between these two intermediate regions. The oblique grooves 44 of one intermediate region are offset with respect to the oblique grooves 44 of the other intermediate region situated on the other side of the mid-plane XX'. Each intermediate region 40 of this second variant is constructed like the intermediate region of the variant shown to the left of the mid-plane XX' in FIG. 1.

Moreover, the central region 30 comprises at the same time grooves 31 extending the oblique grooves 44, these extending grooves 31 opening into a single circumferential groove 21 and being configured such that they do not extend beyond half the width Lc of the central region. All the extending grooves 31 in the central region 30 have the same inclination, whether they are formed on one edge of this central region or on the other, this inclination being different from the inclinations of the oblique grooves 44 of the two intermediate regions 40. Moreover, these extending grooves 31 in the central region are themselves extended by sipes 310 that open into a circumferential groove 21. In a complementary manner, sipes 32 are formed in the central region 30, these sipes 32 having an orientation identical to the orientation of the extending grooves 31 and to the orientation of the sipes 310.

In this directional tread pattern variant, the edges 50 are notched by grooves 52 that extend the oblique grooves 44 of the intermediate regions 40 while being oriented at an angle equal to 90° to the circumferential direction (that is to say at an angle equal to 0° to the axial direction).

The disclosure which has been described with the aid of these two variants is not intended to be limited to only these variants and various modifications can be made thereto without departing from the scope as defined by the claims.

The invention claimed is:

1. A tread for a heavy vehicle tire, this tread having, in the new state, a tread surface of width W that is intended to come into contact with a roadway, this tread having a thickness PMU of material to be worn away during running and comprising:

a mid-plane XX' that divides the tread into two tread halves, four grooves of circumferential overall orientation that are formed symmetrically with respect to the mid-plane, the two grooves closest to the mid-plane delimiting a central region having a width at least equal to 13% and at most equal to 20% of the total width W of the tread, on each side of the tread with respect to the mid-plane, an intermediate region that is delimited by two grooves of circumferential overall orientation, each intermediate region having a width of between 13% and 30% of the width W of the tread, an edge region axially on the outside of each intermediate region, each of the intermediate regions being divided into a plurality of elongate raised elements, each elongate raised element having a contact face which is intended to come into contact with the roadway during running and comprises at least two long sides and at least two short sides, these elongate raised elements delimiting oblique grooves, these oblique grooves having an average width at least equal to 5 mm and opening into the circumferential grooves that delimit the intermediate regions and being inclined at an average angle of between 30 degrees and 60 degrees this angle being measured with respect to the circumferential direction, these elongate raised elements having an average length in the circumferential direction equal to the length of the short sides and between 50 and 70 mm, the depth of the oblique grooves being at least equal to 30% of the depth of the circumferential grooves delimiting the central region, each elongate raised element also comprising a plurality of sipes with a depth at least equal to 50% and at most equal to 100% of the depth of the oblique grooves, these sipes opening into the oblique grooves bordering the elongate elements, these sipes being oriented so as to intersect an internal and oblique cut, each elongate raised element of the intermediate regions also comprises the internal and oblique cut that extends adjacent to and along the oblique grooves bordering this elongate raised element and divides the element into two element parts so as to open onto the short sides of the element and is formed by a wide part forming a groove with a width at least equal to 25% and at most equal to 110% of the width of the oblique grooves and by a narrow part forming a sipe with a width less than 1.0 mm, these wide and narrow parts being in line with one another, wherein the wide parts of the raised elements all open to the respective grooves of circumferential overall orientation in the same circumferential direction, each narrow part forming a sipe being extended radially inwards by a part forming a channel that is intended to form a new groove after a predetermined amount of wear, and wherein each internal and oblique cut has a total depth at least equal to 75% of the thickness PMU to be worn away.

2. The tread according to claim 1, wherein each channel that is intended to form a new groove after partial wear has a width at least equal to 25% and at most equal to 110% of the width of the oblique grooves.

3. The tread according to claim 1, wherein the total length of the sipes of each internal and oblique cut is at least equal to 30% of the length of the long side of the elongate raised element.

4. The tread according to claim 1, wherein the oblique grooves of an intermediate region of the tread are offset circumferentially with respect to the oblique grooves of the other intermediate region.

5. The tread according to claim 1, wherein the oblique grooves formed on the intermediate parts are oriented so as to create a directional pattern.

6. The tread according to claim 1, wherein each oblique groove of the intermediate regions is extended in the central region of the tread by a central oblique cut comprising a groove part that is open both onto the tread surface in the new state and into a single circumferential groove.

7. The tread according to claim 6, wherein all of the central oblique grooves formed in the central region are inclined at one and the same angle measured with respect to the circumferential direction, this angle being different from the angles of the oblique grooves in the intermediate regions.

8. The tread according to claim 7, wherein the central oblique cuts are offset circumferentially and equidistant from one another.

9. The tread according to claim 1, wherein the oblique grooves of each intermediate region are extended by further grooves in each edge region.

10. The tread according to claim 9, wherein the grooves formed in each edge region are inclined with respect to the circumferential direction so as to make an angle equal to 90°.

\* \* \* \* \*